Figure 26:
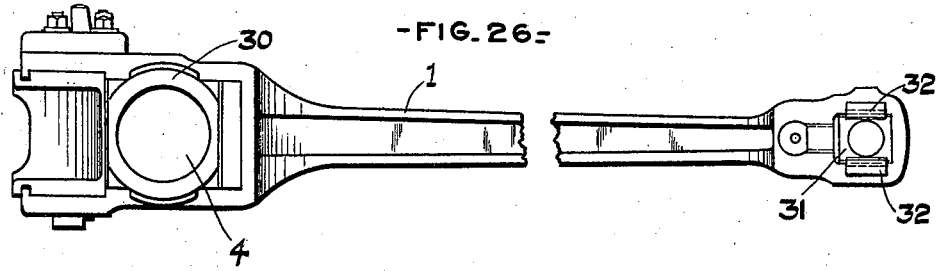

Nov. 12, 1929.   J. G. BLUNT   1,735,491
CONNECTING ROD FOR LOCOMOTIVES
Filed Nov. 13, 1924   10 Sheets-Sheet 1
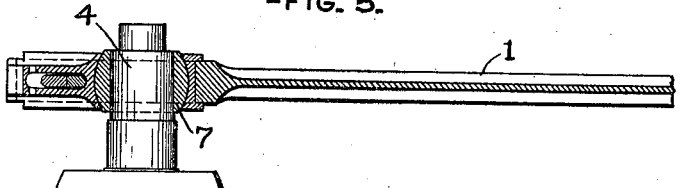
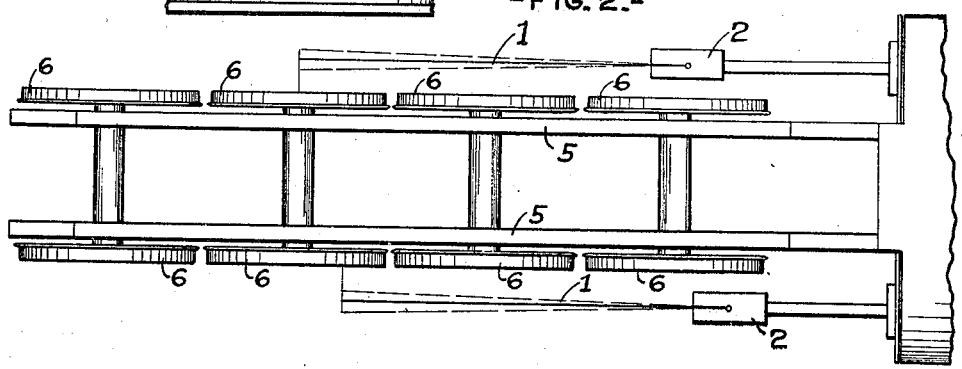
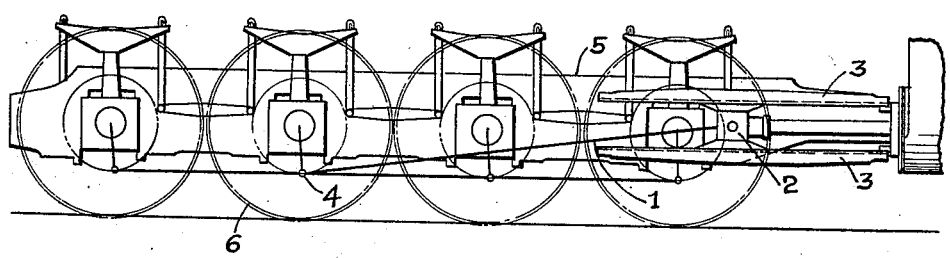
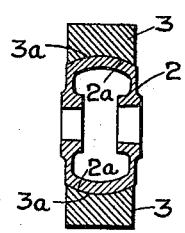
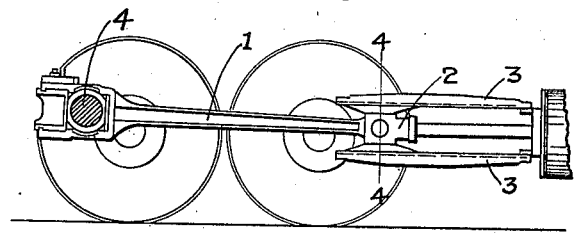
INVENTOR
James G. Blunt
BY
Clarence D. Kerr
ATTORNEY Nov. 12, 1929.   J. G. BLUNT   1,735,491
CONNECTING ROD FOR LOCOMOTIVES
Filed Nov. 13, 1924   10 Sheets-Sheet 2
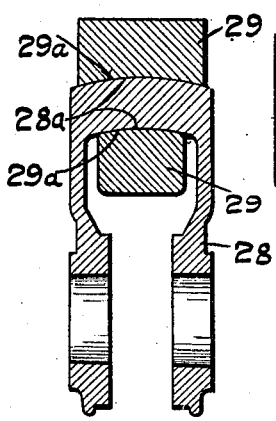
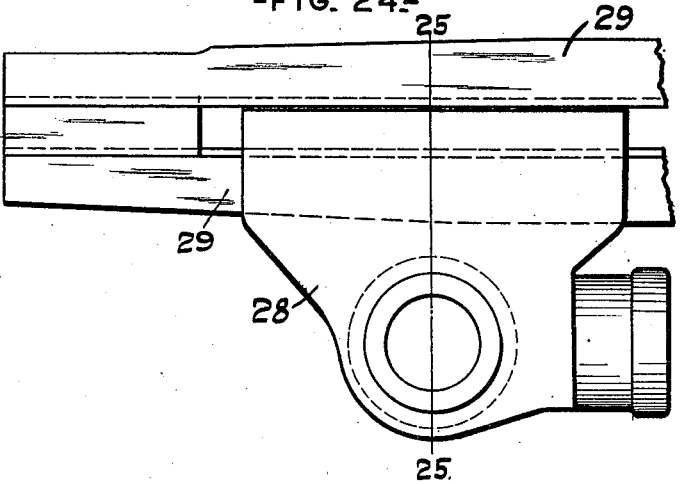
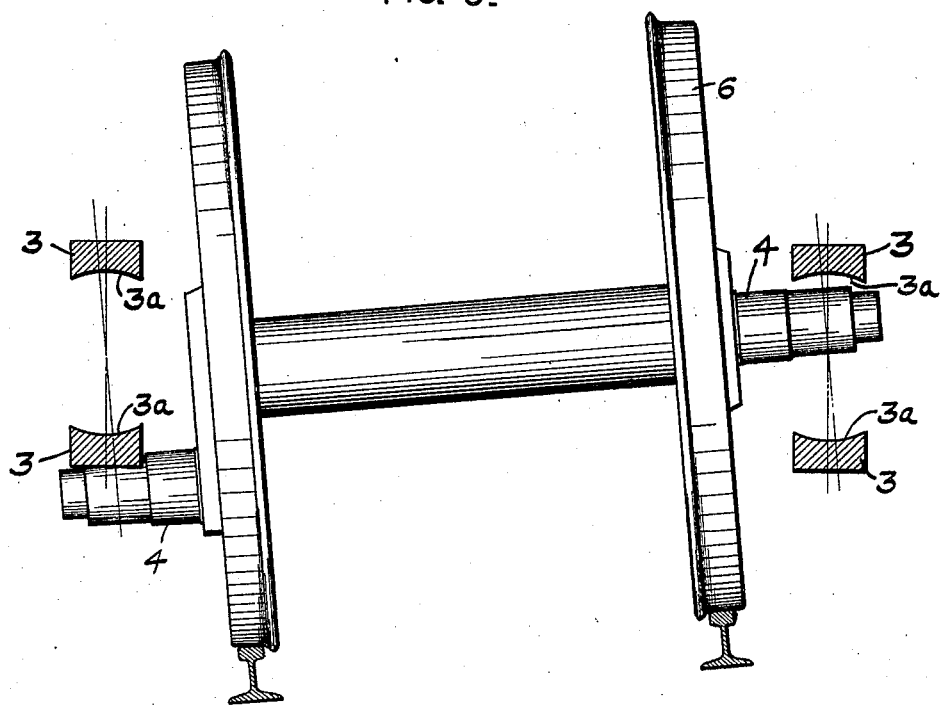
INVENTOR
James G. Blunt
BY
Clarence D. Kerr
ATTORNEY

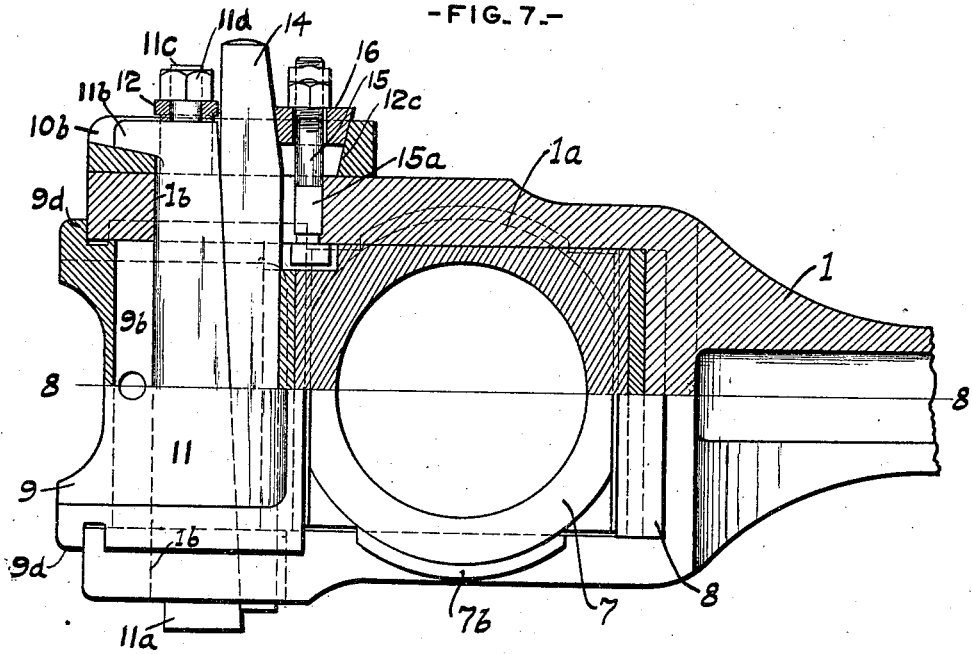
-FIG. 7.-
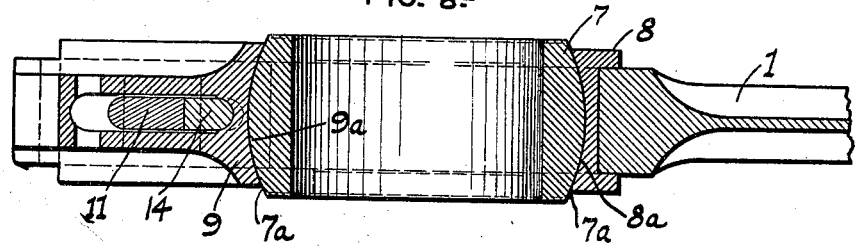
-FIG. 8.-

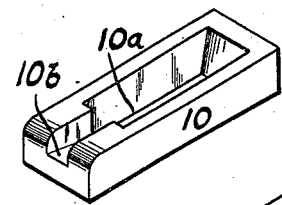
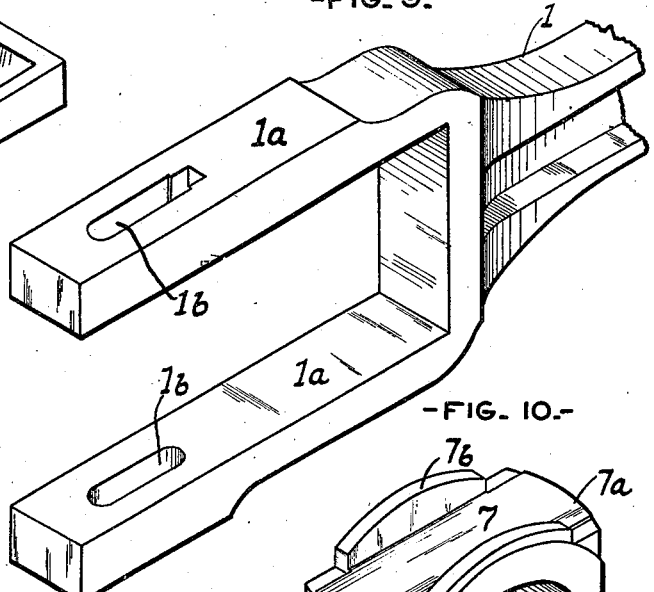
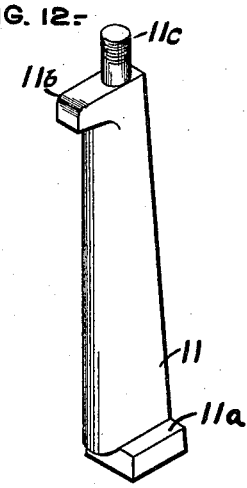
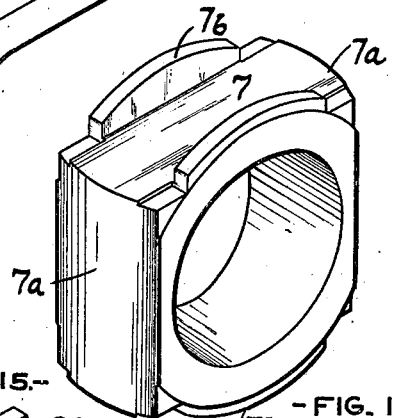
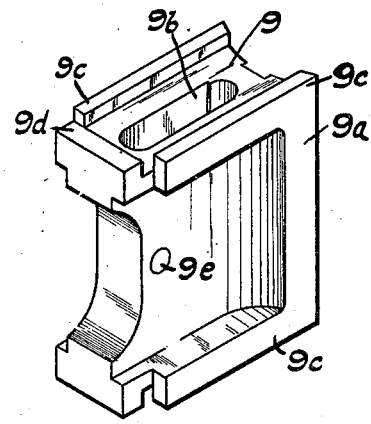
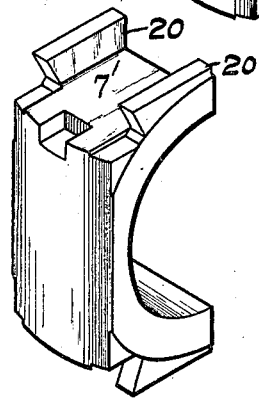

Nov. 12, 1929.　　　J. G. BLUNT　　　1,735,491
CONNECTING ROD FOR LOCOMOTIVES
Filed Nov. 13, 1924　　10 Sheets-Sheet 5
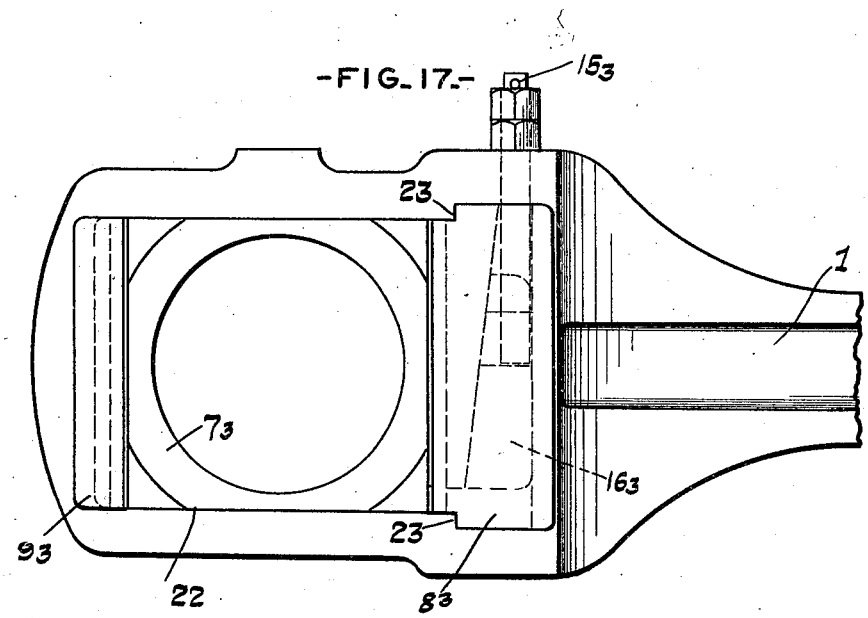
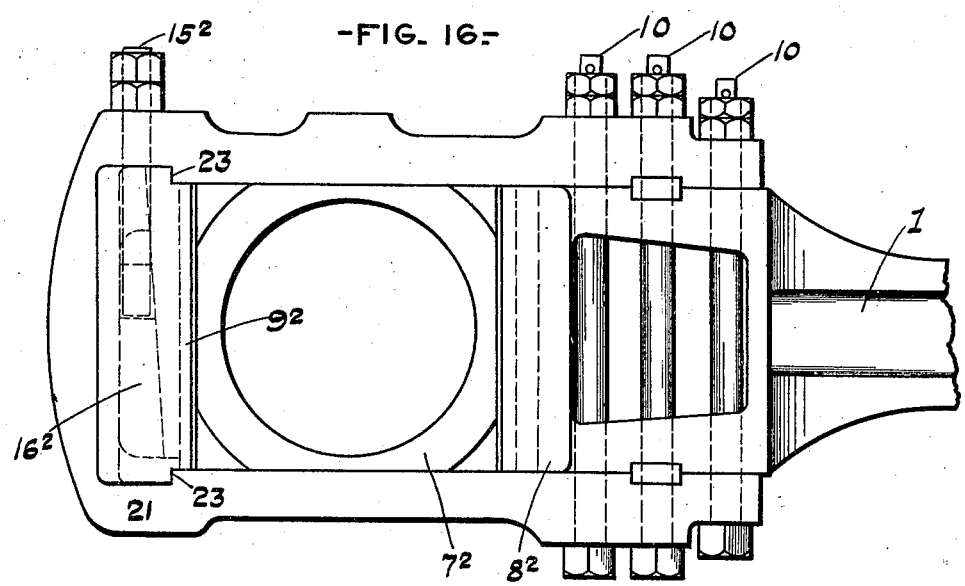
INVENTOR
James G. Blunt
BY
Clarence D. Kerr
ATTORNEY Nov. 12, 1929.   J. G. BLUNT   1,735,491
CONNECTING ROD FOR LOCOMOTIVES
Filed Nov. 13, 1924   10 Sheets-Sheet 6
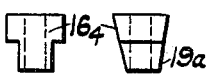
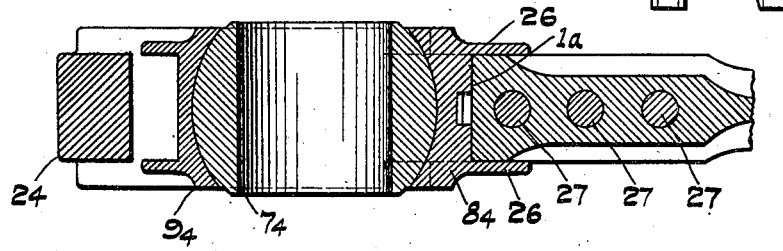
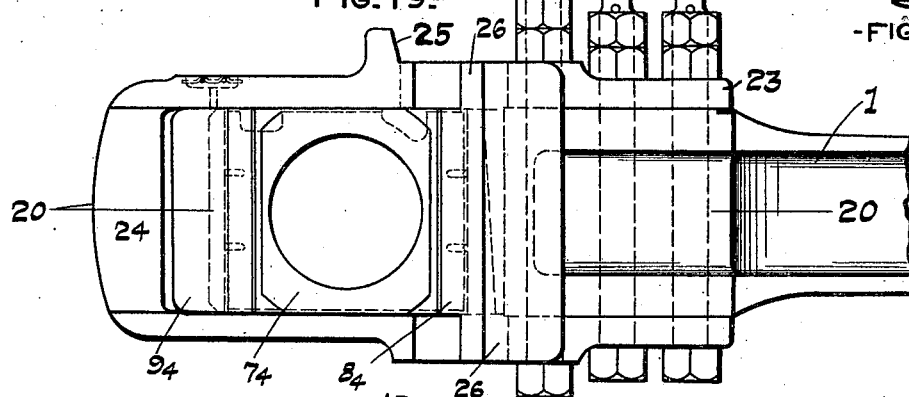
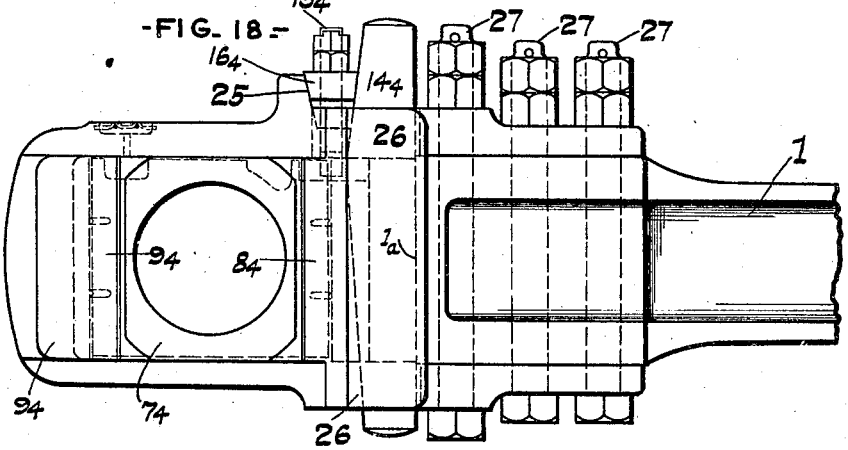
INVENTOR
James G. Blunt
BY
Clarence D. Kerr
ATTORNEY

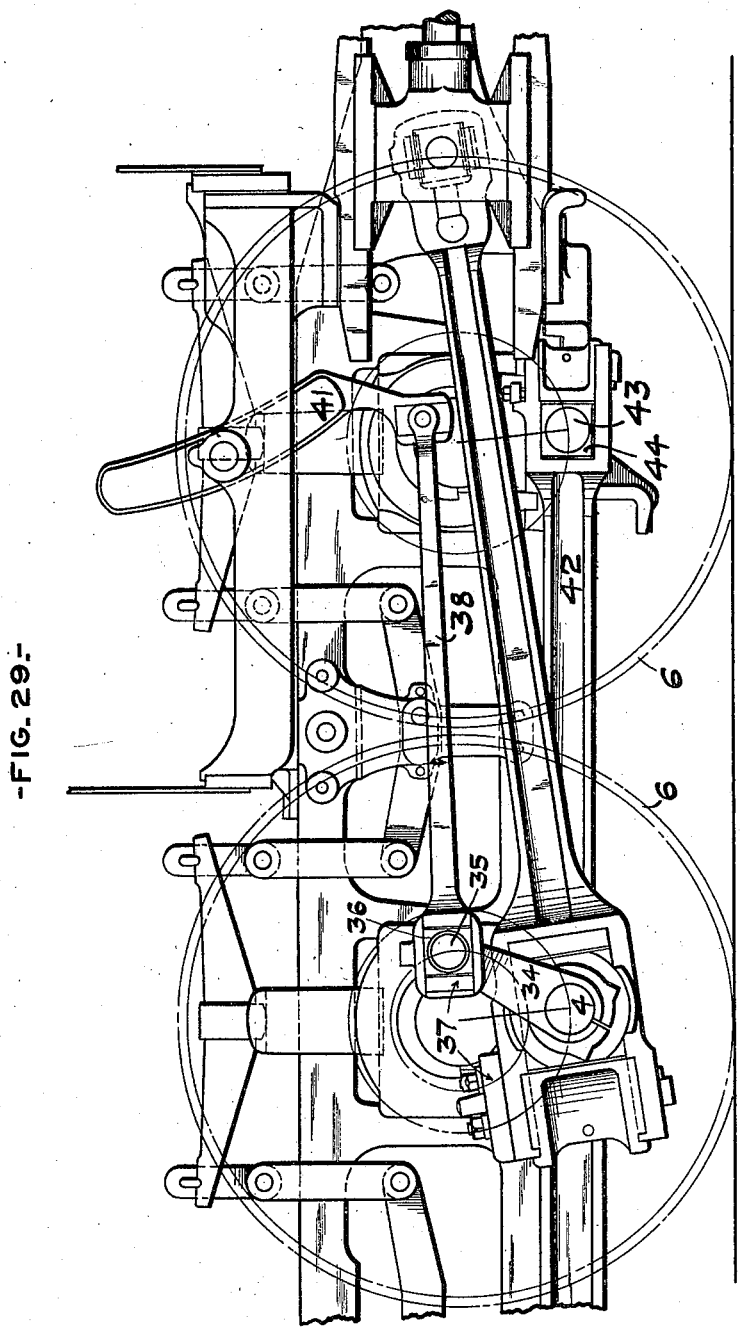

Nov. 12, 1929.  J. G. BLUNT  1,735,491
CONNECTING ROD FOR LOCOMOTIVES
Filed Nov. 13, 1924  10 Sheets-Sheet 9
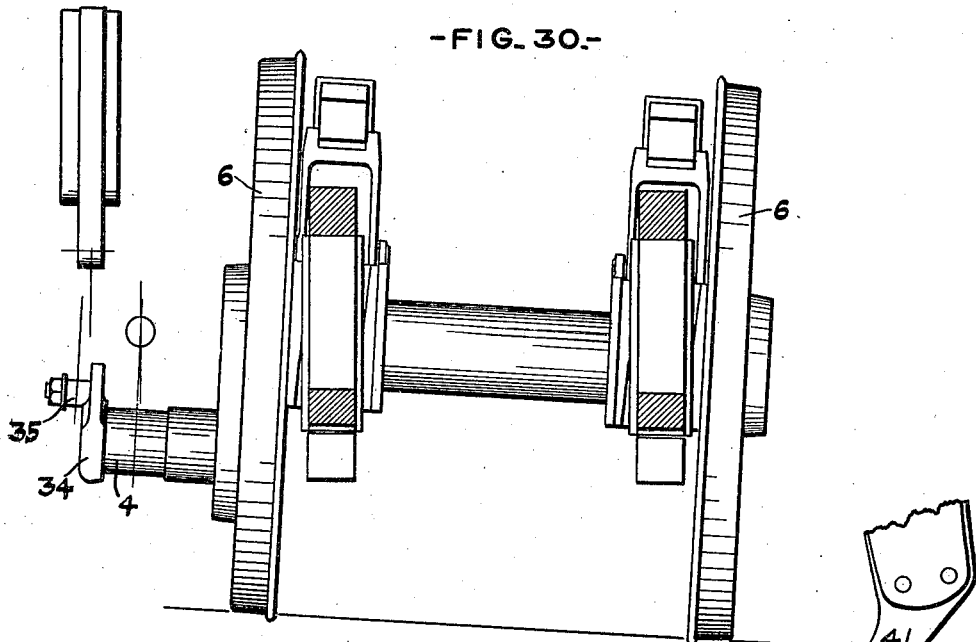
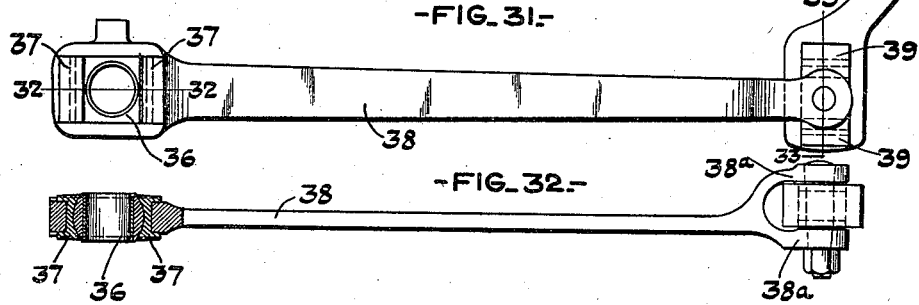
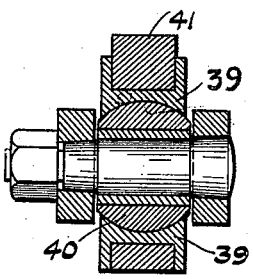
INVENTOR
James G. Blunt
BY
Clarence D Kerr
ATTORNEY Nov. 12, 1929.  J. G. BLUNT  1,735,491
CONNECTING ROD FOR LOCOMOTIVES
Filed Nov. 13, 1924   10 Sheets-Sheet 10
-FIG. 35.-
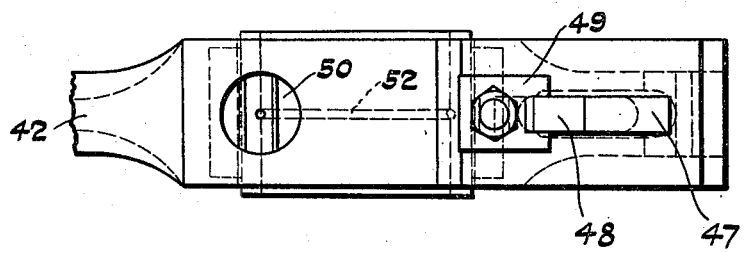
-FIG. 34.-
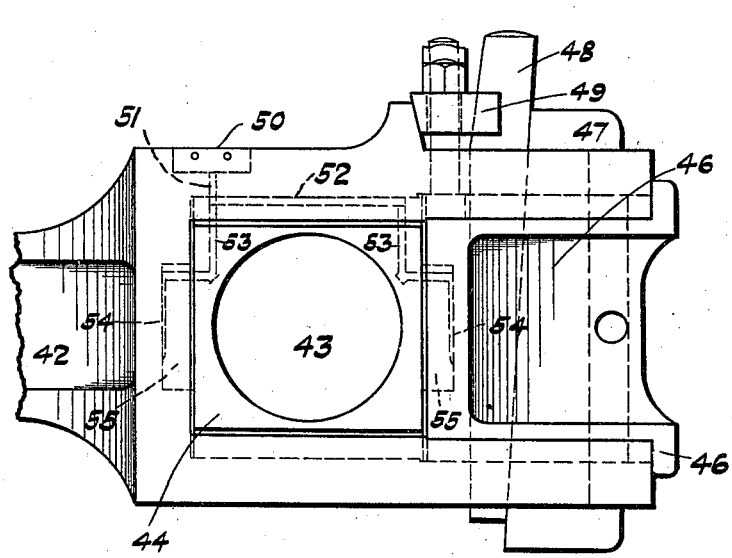
-FIG. 36.-
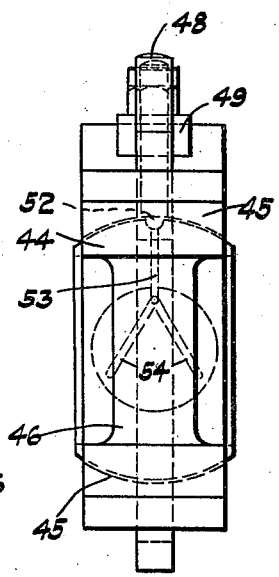
-FIG. 37.-
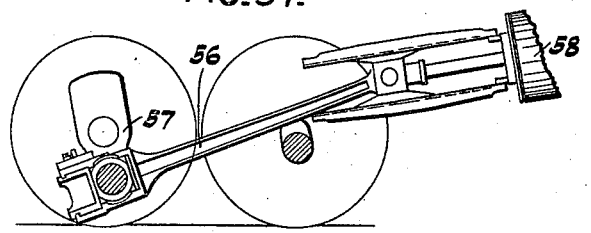
INVENTOR
James G. Blunt
BY
Clarence D. Kerr
ATTORNEY Patented Nov. 12, 1929

1,735,491

UNITED STATES PATENT OFFICE

JAMES G. BLUNT, OF SCHENECTADY, NEW YORK

CONNECTING ROD FOR LOCOMOTIVES

Application filed November 13, 1924. Serial No. 749,585.

My invention relates to connecting rods for locomotive engines and has for its object the construction of rods in such manner that when actuating the crank pins substantially perfect bearing surfaces are maitained for all their wearing parts. It will thus be seen that my invention is particularly applicable to locomotive main rods, since the front ends of such rods are pivoted to the cross heads which are carried by the spring supported structure of the locomotive and hence the movement of such ends of the rods is controlled by that of the said structure while the back ends are attached to the main driving wheel crank pins and are thus subject to any movement the track may give such wheels. My invention therefore comprises means for absorbing the angularities, both lateral and vertical, occasioned when the locomotive is in motion, by irregularities of track, vibration, lateral movement of the axles and driving wheels due to hub play and centrifugal action on curves which result in a twisting action in, and a tendency to distortion of, a rod, as well as angular displacements in the bearings of the rod at one point relative to the bearings of the rod at another point. To this end in carrying out my invention as applied to main rods I construct the cross head or wrist pin bearing so that the rod is capable of axial movement relative to it and thereby prevents the movement of the wrist pin bearings relative to the axis of the rod from having a tendency to distort the rod, and provides the end of the rod, which is secured to the crank pin, with a bearing which compensates for lateral displacement of the axle to which the crank pin is attached. My invention is applicable not only to main rods but also to coupling or side rods and to eccentric rods.

The improvement claimed is hereinafter fully set forth.

Figure 27:
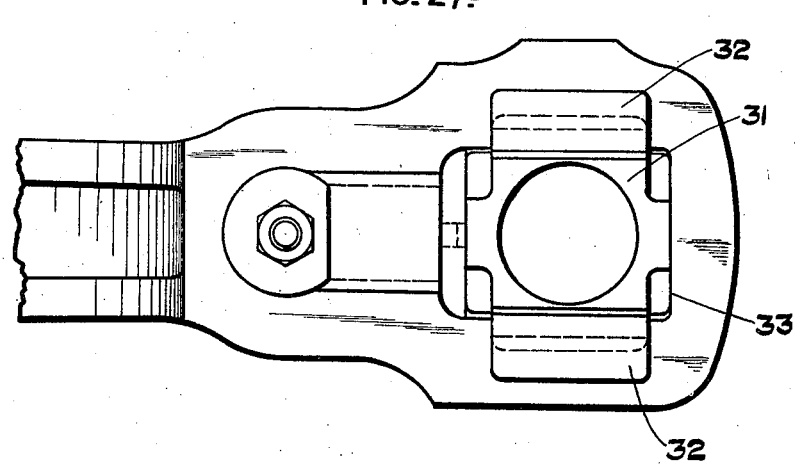
Figure 28:
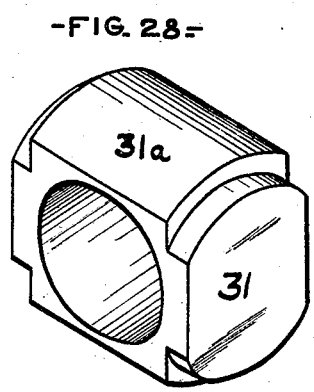

In the accompanying drawings: Figure 1 is a side view, in elevation, of the driving gear of a locomotive, the main and side rods being shown diagrammatically; Fig. 2, a plan view thereof, showing the lateral range of movement of the driving rods, when the locomotive is on curved track; Fig. 3, a side view, in elevation, of a main rod embodying the invention, and the parts to which it is connected; Fig. 4, a vertical section, taken on the line 4—4, of Fig. 3; Fig. 5, a top plan view, partly in section, showing the back end connection of an outside main rod; Fig. 6, a front view, in elevation, of a pair of driving wheels, showing the position which they assume, relatively to the cross head guides, on curved track, due to the difference in elevation between the inner and outer rails; Fig. 7, a side view, partly in elevation, and partly in section, of the back end of a main rod, embodying the invention; Fig. 8, a transverse section, taken on the line 8—8 of Fig. 7; Figs. 9 to 14, inclusive, perspective views, showing details of the connection and anti-spreading means at the rear end of a main rod of the forked type, shown in Figs. 7 and 8; Fig. 15, a perspective view, of a modified type of bearing block; Fig. 16, a side view, in elevation, showing the invention applied to a main rod having a back end of the strap type; Fig. 17, a similar view, showing the invention applied to a rod having a back end of the solid type; Fig. 18, a similar view, showing the invention applied to the back end of a main rod, in wihch the bearing is secured by a U-shaped strap; Fig. 19, a view, similar to Fig. 18, but with the wedge key and wedge block removed; Fig. 20, a transverse section, taken on the line 20—20, of Fig. 19; Figs. 21 and 22, end and side views, respectively, in elevation, of the locking wedge; Fig. 23, a side view, in elevation, of the key employed in the construction shown in Fig. 18; Fig. 24, a side view, in elevation, showing the invention applied with cross-head guides of the Laird type; Fig. 25, a vertical section, taken on the line 25—25 of Fig. 24; Fig. 26, a side view, in elevation showing a main rod having radial bearings at both ends; Fig. 27, a side view, in elevation, and on an enlarged scale, of the front end of the main rod shown in Fig. 26; Fig. 28, a perspective view of the front end bearing shown in Fig. 26; Fig. 29, a side view, in elevation, showing the application, to a locomotive, of a main rod, a side rod, and an eccentric rod, each embodying the invention; Fig. 30, a front view, in elevation, showing the resultant angularity of the rods, when the locomotive is running on rails of unequal height; Fig. 31, a side view, in elevation, showing an eccentric rod, embodying the invention applied to a Walschaerts link; Fig. 32, a plan view of the same, the rear end of the rod being shown in section, taken on the line 32—32 of Fig. 31; Fig. 33, a vertical section, on an enlarged scale, taken on the line 33—33 of Fig. 31; Fig. 34, a side view, in elevation, and on an enlarged scale, of the forward end of the side rod, shown in Fig. 29; Figs. 35 and 36, a plan view and an end view, respectively, of the same; and Fig. 37, a side view, in elevation, of the middle cylinder, the main rod therefor, and certain associated parts, showing the rod in its extreme position of angularity.

In the practice of the invention, referring descriptively to the specific embodiment thereof which is herein exemplified, the main rods, 1, are connected to the cross heads, 2, of the main driving wheels 6 by the crank pins 4. The cross heads 2 slide in the guides 3, which are supported on the main frame 5 of the engine. The sliding surfaces $2^a$ of the cross heads 2 are made arc-shaped to cooperate with corresponding surfaces $3^a$ of the guides, in order that the cross head 2 and rod 1 may rotate on the axis of the cylinder and so compensate for any twisting action in the rod caused by irregularities in the track in the vertical plane which causes the driving axles to assume an angular position relative to their normal horizontal axis, which, if not rectified, would tend to cause a distortion of the rod 1.

To compensate for lateral displacement of the axles and the driving wheels 6, I provide a rotative bearing 7 at the main crank pin connection 4, which in Figs. 3, 5, 7, 8, 16, 17, 18, 19, 20 and 26 I have shown applied to the back end of a main rod 1. The bearing 7 has radial convex faces $7^a$, one of which fits forwardly against a concave radial face $8^a$ of the flanged block 8, which is seated in the forward end of the opening between the arms $1^a$ of the rod 1, and the other of which fits rearwardly against another concave radial face $9^a$ on the filler block 9, which seats between the rear ends of the arms $1^a$. I have shown the bearing 7 equipped with the flanges $7^b$, which are chiefly of assistance in lining up the bearing when it is inserted in the rod, since when assembled they do not bear against the sides $1^a$ of the rod, as sufficient clearance is provided therebetween so as to permit the bearing 7 and rod 1 to swivel.

A bearing block 10 rests on the upper arm $1^a$ and has a slot $10^a$ which registers with the apertures $1^b$ and $9^b$ in the arms $1^a$ and the spreader block 9, respectively.

The wedge 11, which is straight on its back edge but tapered on its front edge, is inserted upwardly through the apertures $1^b$, $9^b$ and $10^a$ in the arms $1^a$, the spreader block 9, and the bearing block 10, respectively, until its lateral extensions $11^a$ are brought into bearing with the under side of the lower arm $1^a$ and its rearward projection $11^b$ seats in the recess $10^b$ in the rear upper surface of the block 10. A saddle 12 straddles the threaded upward extension $11^c$ of the wedge 11 and rests on the top of top arm $1^a$ of the rod, and thus forms a seat for the nut $11^d$ which engages the threaded upper end $11^e$, so that the tightening of the nut $11^d$ exerts tension on the wedge 11 and thus draws it against the lower arm $1^a$ and toward the upper arm $1^a$ in such a way that resistance is thus provided against any spreading action of the arms $1^a$. The key 14 is driven in between the forward face of the aperture $9^b$ in the filler block 9 and the forward face of the wedge 11, thus causing the radial faces $9^a$ of the filler block to bear snugly against the rear radial face $7^a$ of the bearing 7. Upon the bolt 15 is mounted a wedge block 16 by which the key 14 is held in position. The bolt 15 must be placed in position in the upper arm $1^a$ before the filler block 9 is inserted. As the wedge block 16 is drawn down by the bolt 15, it engages the tapered face $12^c$ in the forward end of the bearing block 10 and the tapered forward face of the key 14, and thereby clamps the key 14 tightly in position and also serves as a ready takeup in case of wear. The lower end, $15^a$, of the bolt, 15, is made square, to prevent the bolt turning in the slot $1^b$. The filler block 9 has flanges $9^c$ extending over the sides of the arms $1^a$ to guide it and hold it in position, and stops $9^d$ to prevent it from being moved too far inwardly so as to cramp the bearing 7. A hole $9^e$ is provided for the purpose of inserting a puller when the filler 9 is to be removed. In Fig. 15 I have shown one half of a modified form of bearing block 7' which is like that shown in the form shown in Figs. 7, 8 and 10, except that it is made in two like parts, one of which is here shown, and the aligning flanges 20 are more extended than in the preferred form.

In Fig. 16 I have shown my invention applied to a rod with a strap type rear end of ordinary construction, in which the bearing $7^2$ is secured in a U-shaped strap 21, and the strap 21 is bolted to the rear end of the rod, the bearing $7^2$ being secured within the strap and between the radially faced blocks $8^2$ and $9^2$. A wedge face forms the rear side of the block $9^2$, which is held in position by the wedge block $16^2$, which is drawn up against the rear side of the block $9^2$ by the bolt $15^2$.

In Fig. 17 I have shown my invention applied to a rod with a solid back end with a transverse aperture 22 therethrough in which the bearing $7^3$ is inserted and the radially faced blocks $8^3$ and $9^3$ are brought into proper relation by means of the wedge 16³, which is secured in position by the bolt 15³. The back ends shown in both Figs. 16 and 17 are provided with shoulders 23 which prevent the wedges from being drawn up so tightly that they will cramp the bearing and prevent it from rotating.

In Figs. 18 to 23, inclusive, I have shown my invention applied to a rod back end having a U-shaped strap 24 bolted thereto. The bearing 7⁴ is mounted between the usual radially faced blocks 8⁴ and 9⁴ and is secured firmly in position by wedge key 14⁴, which has oppositely inclined rear faces $a$ and $b$, the lower face $a$ engaging the inclined forward face of the block 8⁴. The wedge key 14⁴ is held in position by the wedge block 16⁴ having bevelled faces, 19ª, which is drawn down by the bolt 15⁴ between the bevelled face $b$ on the key 14⁴ and the inclined shoulder 25 on the strap 24. The block 8⁴ has also forwardly and vertically extending flanges 26 which engage the sides of rod and strap and thus assist in holding the parts in fixed relation.

As is shown in Fig. 19, the bearing 7⁴ may be disassembled from the rod, without disturbing the bolts 27 which secure the strap and rod together, by removing the wedge block 16⁴, bolt 15⁴ and key 14⁴, which permits the block 8⁴ and bearing 7⁴ to be slid forwardly a distance sufficient to allow the block 9⁴ to be taken out of the strap 24.

In Figs. 24 and 25 I have shown my invention as applied to a cross head 28 sliding in guides 29 of the so-called Laird type, in which the engaging surfaces 28ª and 29ª of the cross head and guides are struck on arcs radial to the axis of the cylinder so as to permit the rod and wrist pin to rotate on the axis of the cylinder.

In Figs. 26, 27 and 28 I have shown both front and rear ends of the rod equipped with bearings 30, 31, which are similar to the bearing 7, but the front or wrist pin bearing 31 has its radial faces 31ª on the top and bottom thereof instead of at its sides. The radial faces 31ª engage corresponding radial faces on the flanged shoes 32 which are arranged in the top and bottom of the aperture 33 through the rod. The bearing 31 is applied to the rod, after the shoes 32 have been placed in position, by being turned on its side and then rotated to bring its radial faces into engagement with the radial faces of its shoes. It is obvious that this bearing 31 will absorb the twisting action of the rod just as effectively as the curved surfaces of the cross head and guides shown in Figs. 6, 24 and 25.

In Figs. 29 to 36 I have shown by invention applied to an eccentric rod as well as to main and side rods. The same provision for angular movement is necessary in eccentric rods as in main or side rods, since the front end of the eccentric rod is coupled to the Walschaert link 41 which forms a part of the locomotive valve gear and the back end is coupled to the main driving wheel by means of the eccentric crank 34 and pin 35.

The bearing 36 in the rear end of the rod 38 is provided with vertically disposed cylindrical faces which engage corresponding concave faces on the flanged bearing blocks 37 which seat in the aperture in the back end of the rod 38. The front end of the rod 38 terminates in a forked or two-armed portion, and between the arms 38ª and pivoted thereto is a bearing 40 which has cylindrical faces struck about a horizontal axis which engage complementary concave faces on the flange blocks 39 mounted in the link 41. It will therefore be seen that the bearing 36 with its vertically disposed faces and the bearing 40 with its horizontally disposed faces provide for universal movement of the eccentric rod 38.

The side rod 42 is connected at its forward end to the crank pin 43 on the forward driving wheel by a bearing 44 rotatable about the longitudinal axis of the rod upon its surfaces 45, so as to permit movement of the rod 42 about its own longitudinal axis relative to the forward pair of driving wheels, and such a connection is preferably used with the crank pins of the other driving wheels, except that the bearing at the main driver is fixed in the rod eye. The bearing 44 is shown in Figs. 34, 35 and 36 as being secured in the forked end of the rod 42 by the spreader block 46, which is held in position by the main wedge 47, key 48 and locking elements 49.

For the purpose of lubricating the bearing an oil pocket 50 is formed in the upper surface of the upper arm of the fork for the reception of an oil sponge. An oil channel 51 leads downward to surface 45 communicating with the duct 52, which extends lengthwise along the upper face of the bearing 44. From the duct 52 other channels 53 lead downward through the bearing to the blind end grooves 54 on the bearing trunnions 55. As the weight of the rod 42 rests on the upper arc-shaped surface of the bearing there is no necessity of providing any lubrication on the under side of the bearing. From the foregoing it will be seen that no oil can work itself to the outside without having passed over a surface intended to be lubricated.

In Fig. 37 I have shown my invention applied to a connecting rod 56 attached to the crank shaft 57 of the main driving wheels and driven by the middle cylinder 58 of a three cylinder locomotive in which very extreme rod angularities are found. It will be seen that the rod and bearings are of the same form as is shown in Figs. 3, 4, 5, 7 and 8.

The invention claimed as new and desired to be secured by Letters Patent is:

1. A connecting rod for locomotives having in an end thereof cylindrical surfaces fixed in the rod and radial to a vertical axis, a crank pin bearing having a horizontal aperture for a crank pin and exterior surfaces complementary to and engaging the said cylindrical surfaces, the rod at its opposite end having a connection with a cylinder piston, complementary cylindrical surfaces in such connection disposed so as to permit the rod to rotate about its longitudinal axis.

2. A rod for locomotives connecting a source of power to a driven axle, bearings connected to the ends of the rod, one of which is rotative only about the longitudinal axis of the rod and the other only about an axis at right angles to the longitudinal axis of the rod and to the axis of the driven axle.

3. A main rod for locomotives arranged to transmit power from a wrist pin to a crank pin fixed upon a driven axle, a bearing in one end of the rod engaging the wrist pin, the wrist pin bearing having associated with it arc-shaped surfaces engaging corresponding surfaces to permit the rod to rotate about its axis, and a bearing in the opposite end of the rod having arc-shaped surfaces struck from a vertical axis engaging corresponding surfaces in the rod to permit that end of the rod to move laterally with the crank pin while maintaining a full bearing thereon.

4. In a main rod connecting a member having a reciprocating movement to a member having a rotary movement, bearings at the connections between the rod and the members, each bearing providing means permitting rotary movement of the rod about a single axis, the axis for one bearing being perpendicular to the axis for the other bearing, the resultant of such movements being to permit the rod to adjust itself universally to lateral and vertical movements of said members.

5. A connecting rod for locomotives having at one end a bearing seat having faces radial to the longitudinal axis of the rod, a bearing with complementary radial faces engaging said seat and provided with a horizontal aperture therethrough for a crank pin, the rod being capable of rotation on its own axis about the said bearing.

6. A connecting rod for locomotives having in one end a transversely extending aperture, shoes seated in the aperture, a bearing seating between the shoes, the shoes and bearing having cooperating cylindrical faces arranged about an axis normal to the axis of the rod, one of the shoes and the portions of the rod above and below the aperture being slotted for adjusting members, and a saddle seated on the rod and forming a means for securing the adjusting members in position.

JAMES G. BLUNT.